United States Patent
Neumann et al.

(10) Patent No.: US 11,379,426 B2
(45) Date of Patent: Jul. 5, 2022

(54) MEDIA TRANSFER PROTOCOL FILE COPY DETECTION

(71) Applicant: Forcepoint, LLC, Austin, TX (US)

(72) Inventors: Randall Neumann, Springville, UT (US); John W. Rosenvall, Pleasant Grove, UT (US)

(73) Assignee: Forcepoint, LLC, Austin, TX (US)

( * ) Notice: Subject to any disclaimer, the term of this patent is extended or adjusted under 35 U.S.C. 154(b) by 234 days.

(21) Appl. No.: 16/267,971

(22) Filed: Feb. 5, 2019

(65) Prior Publication Data

US 2020/0250142 A1 Aug. 6, 2020

(51) Int. Cl.
*G06F 16/178* (2019.01)
*H04L 67/06* (2022.01)
*G06F 16/16* (2019.01)
*H04L 65/65* (2022.01)

(52) U.S. Cl.
CPC .......... *G06F 16/178* (2019.01); *G06F 16/16* (2019.01); *H04L 65/608* (2013.01); *H04L 67/06* (2013.01)

(58) Field of Classification Search
None
See application file for complete search history.

(56) References Cited

U.S. PATENT DOCUMENTS

| | | |
|---|---|---|
| 6,907,531 B1 | 6/2005 | Dodd et al. |
| 7,574,740 B1 | 8/2009 | Kennis |
| 7,882,538 B1 | 2/2011 | Palmer |
| 8,230,505 B1 | 7/2012 | Ahrens et al. |
| 10,326,735 B2 | 6/2019 | Jakobsson et al. |
| 2002/0078382 A1 | 6/2002 | Sheikh et al. |
| 2003/0145225 A1 | 7/2003 | Bruton et al. |
| 2003/0145226 A1 | 7/2003 | Bruton et al. |
| 2003/0188189 A1 | 10/2003 | Desai et al. |
| 2004/0049693 A1* | 3/2004 | Douglas ............... G06F 21/552 726/23 |
| 2005/0138402 A1 | 6/2005 | Yoon et al. |
| 2005/0171954 A1 | 8/2005 | Hull et al. |
| 2006/0005085 A1* | 1/2006 | Zunino ............... G06F 11/3495 714/38.11 |

(Continued)

OTHER PUBLICATIONS

Symantec.com, Which tuning is available for improving the performance of Symantec Endpoint Protection clients during scan, https://support.symantec.com/en_US/article.TECH143941.html, Jan. 6, 2011.

(Continued)

*Primary Examiner* — Irene Baker
(74) *Attorney, Agent, or Firm* — Terrile, Cannatti & Chambers, LLP; Emmanuel A. Rivera (57) ABSTRACT

A method, system and computer-usable medium for detecting if a file(s) is/are copied to/from a computing device from/to one or more other devices. The computing device or information handling device is connected to other devices using a transfer protocol such as Media Transfer Protocol. File activity is monitored between the computing device and the other devices. Each file activity is entered into a common queue available to the computing device and the other devices. Comparison is made at to the entries in the queue as to entries that the same size and the file activity happens within a time window. Pairs that meet the size and activity time window are determined to be file copy pairs.

11 Claims, 6 Drawing Sheets

(56) References Cited

U.S. PATENT DOCUMENTS

| | | | |
|---|---|---|---|
| 2006/0047805 A1* | 3/2006 | Byrd | G06F 11/3495 709/224 |
| 2006/0085543 A1 | 4/2006 | Hrastar et al. | |
| 2006/0117172 A1 | 6/2006 | Zhang et al. | |
| 2006/0248177 A1* | 11/2006 | Dostert | G06F 11/3476 709/223 |
| 2007/0204003 A1* | 8/2007 | Abramson | H04L 67/02 709/217 |
| 2007/0208813 A1 | 9/2007 | Blagsvedt et al. | |
| 2008/0082722 A1 | 4/2008 | Savagaonkar et al. | |
| 2009/0222602 A1* | 9/2009 | Krig | G06F 13/4278 710/74 |
| 2009/0249466 A1 | 10/2009 | Motil et al. | |
| 2009/0254572 A1 | 10/2009 | Redlich et al. | |
| 2010/0010968 A1 | 1/2010 | Redlich et al. | |
| 2012/0246303 A1* | 9/2012 | Petersen | G06F 16/1734 709/224 |
| 2013/0080641 A1 | 3/2013 | Lui et al. | |
| 2013/0085761 A1 | 4/2013 | Bringert et al. | |
| 2013/0124644 A1 | 5/2013 | Hunt et al. | |
| 2013/0231084 A1 | 9/2013 | Raleigh | |
| 2013/0269029 A1 | 10/2013 | Nakawatase et al. | |
| 2013/0275574 A1 | 10/2013 | Hugard, IV et al. | |
| 2013/0298192 A1 | 11/2013 | Kumar et al. | |
| 2013/0346945 A1* | 12/2013 | Yousouf | G06F 8/60 717/121 |
| 2014/0025840 A1* | 1/2014 | Dalmia | H04L 1/00 709/232 |
| 2014/0082726 A1 | 3/2014 | Dreller et al. | |
| 2014/0198958 A1 | 7/2014 | Nathan et al. | |
| 2014/0208420 A1* | 7/2014 | Mraz | H04L 63/1408 726/22 |
| 2014/0379812 A1 | 12/2014 | Bastide et al. | |
| 2015/0066896 A1 | 3/2015 | Davis et al. | |
| 2015/0067763 A1* | 3/2015 | Dalcher | G06F 21/566 726/1 |
| 2015/0261969 A1 | 9/2015 | Frost | |
| 2015/0264049 A1 | 9/2015 | Achilles et al. | |
| 2015/0288714 A1 | 10/2015 | Emigh et al. | |
| 2016/0042179 A1 | 2/2016 | Weingarten et al. | |
| 2016/0055334 A1 | 2/2016 | Herwono et al. | |
| 2016/0148019 A1 | 5/2016 | Rambler et al. | |
| 2017/0126718 A1 | 5/2017 | Baradaran et al. | |
| 2017/0149795 A1 | 5/2017 | Day, II | |
| 2017/0214705 A1 | 7/2017 | Gupta | |
| 2017/0244729 A1 | 8/2017 | Fahrny et al. | |
| 2017/0302822 A1 | 10/2017 | Vandeweerd et al. | |
| 2017/0329966 A1 | 11/2017 | Koganti et al. | |
| 2018/0152471 A1 | 5/2018 | Jakobsson | |
| 2018/0174138 A1 | 6/2018 | Subbarayan et al. | |
| 2018/0234368 A1 | 8/2018 | Everton | |
| 2019/0034625 A1 | 1/2019 | Ford et al. | |
| 2019/0124117 A1 | 4/2019 | Swafford | |
| 2019/0124118 A1 | 4/2019 | Swafford | |
| 2019/0199745 A1 | 6/2019 | Jakobsson et al. | |
| 2019/0213401 A1 | 7/2019 | Kuang | |
| 2019/0370851 A1 | 12/2019 | Haddadnia | |
| 2020/0074481 A1 | 3/2020 | Zhang | |
| 2020/0134192 A1 | 4/2020 | Gupta et al. | |
| 2020/0234243 A1 | 7/2020 | Miron et al. | |
| 2020/0242260 A1 | 7/2020 | Chen et al. | |
| 2020/0257821 A1 | 8/2020 | Lai | |
| 2020/0257822 A1 | 8/2020 | Ford et al. | |
| 2020/0257823 A1 | 8/2020 | Ford et al. | |

OTHER PUBLICATIONS

Microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS ONE 12(2): e0170579, 2017.

Sans ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

Pconlife.com, wpdmon.exe File Information, printed Mar. 21, 2019 https://www.pconlife.com/viewfileinfo/wpdmon-exe/.

* cited by examiner

MEDIA TRANSFER PROTOCOL FILE COPY DETECTION

BACKGROUND OF THE INVENTION

Field of the Invention

The present invention relates in general to the field of computers and similar technologies, and in particular to software utilized in this field. Still more particularly, the present invention relates to a method, system and computer-usable medium for detecting if, and which, file(s) is/are copied to/from a computing device from/to one or more other devices.

Description of the Related Art

Users interact with physical, system, data, and services resources of all kinds, as well as each other, on a daily basis. Each of these interactions, whether accidental or intended, poses some degree of security risk, depending on the behavior of the user.

Users receive and send data or files through computing devices or information handling devices, such as endpoint devices. In particular, computing devices or endpoint devices send data and files to other devices, such phones, tablets, and other computing devices. Such transfer of data or files can use Media Transfer Protocol or MTP. The transfer can occur over various connections, such as universal serial bus (USB), Bluetooth, Transmission Control Protocol (TCP), etc.

In general, using MTP, when a device (i.e., portable device) is connected to the computing device, such as an endpoint device, the computing device queries the device and the device responds with a list of files and directories that are available from the device. The computing device can download a file by requesting the file from the device. The device can send the file over the MTP connection. If a computing device wants to upload a file to a device, the computing devices sends the file to the device and the device chooses to save the file. However, MTP technology does not provide an adequate method to monitor and determine that a file copy has taken place or where the file was copied from.

Certain methods may monitor activity, but do not provide a method to pair destination and source files, or gather information about the files. Other methods require user intervention, such as opening a window, identifying, and dropping and dragging files.

SUMMARY OF THE INVENTION

A method, system and computer-usable medium for detecting if a file(s) is/are copied to/from a computing device from/to one or more other devices.

More specifically, in one embodiment the invention relates to monitoring file transfer activity between a computing device and one or more connected devices; gathering information related to each occurrence of the file transfer activity; entering the each occurrence and the information of the each occurrence as an entry into a common queue; and comparing entries in the common queue, with entries kept for a predetermined time, to determine entry pairs having same size file wherein determined pairs relate to a file copy activity where the source file was read and the destination file was created. Entries remain in the queue for a predetermined amount of time enabling the pair matching In another embodiment the invention relates to a system that includes a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for monitoring file transfer events between the system and one or more connected devices; collecting information related to each file transfer event; entering each file transfer event and the information of each file transfer event into a combined and common queue shared by the system and the devices; and comparing entries of the file transfer events in the combined and common queue to determine pairs having same size file, and time stamps within a predetermined time window, wherein determined pairs relate to a file copy activity where the source file was read and the destination file was created.

In another embodiment the invention relates to a computer-readable storage medium embodying computer program code, the computer program code includes computer executable instructions configured for: monitoring file transfer events between an information handling device and one or more devices connected to the information handling device; gathering information related to each file transfer event; entering each file transfer event and the information of each file transfer event into a queue shared by the information handling system and the one or more devices; and comparing entries of the file transfer events queue to determine pairs having same file size, and time stamps within a predetermined time window, wherein determined pairs relate to a file copy activity and file read activity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for detecting if a file(s) is/are copied to/from a computing device from/to one or more other devices. Data or files may be sent and received by a computing device or information handling system, which can also be referred to as an endpoint device. The data or files can be sent to one or more portable devices. The portable devices can also send data or files to the computing device. The computing device and portable devices can use media transfer protocol in communicating or transferring the data or files. Furthermore, connection between the computing device and portable devices can be performed over a variety of connections, including Universal Serial Bus (USB), Bluetooth, etc. Various operating systems can be implemented at the computing device and portable devices, including Android®, Windows®, Linux® operating systems. Different media data or files can be transferred between the computing device and portable devices, such as text, graphics, audio, video, etc.

For the purposes of this disclosure, a computing device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes.

For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
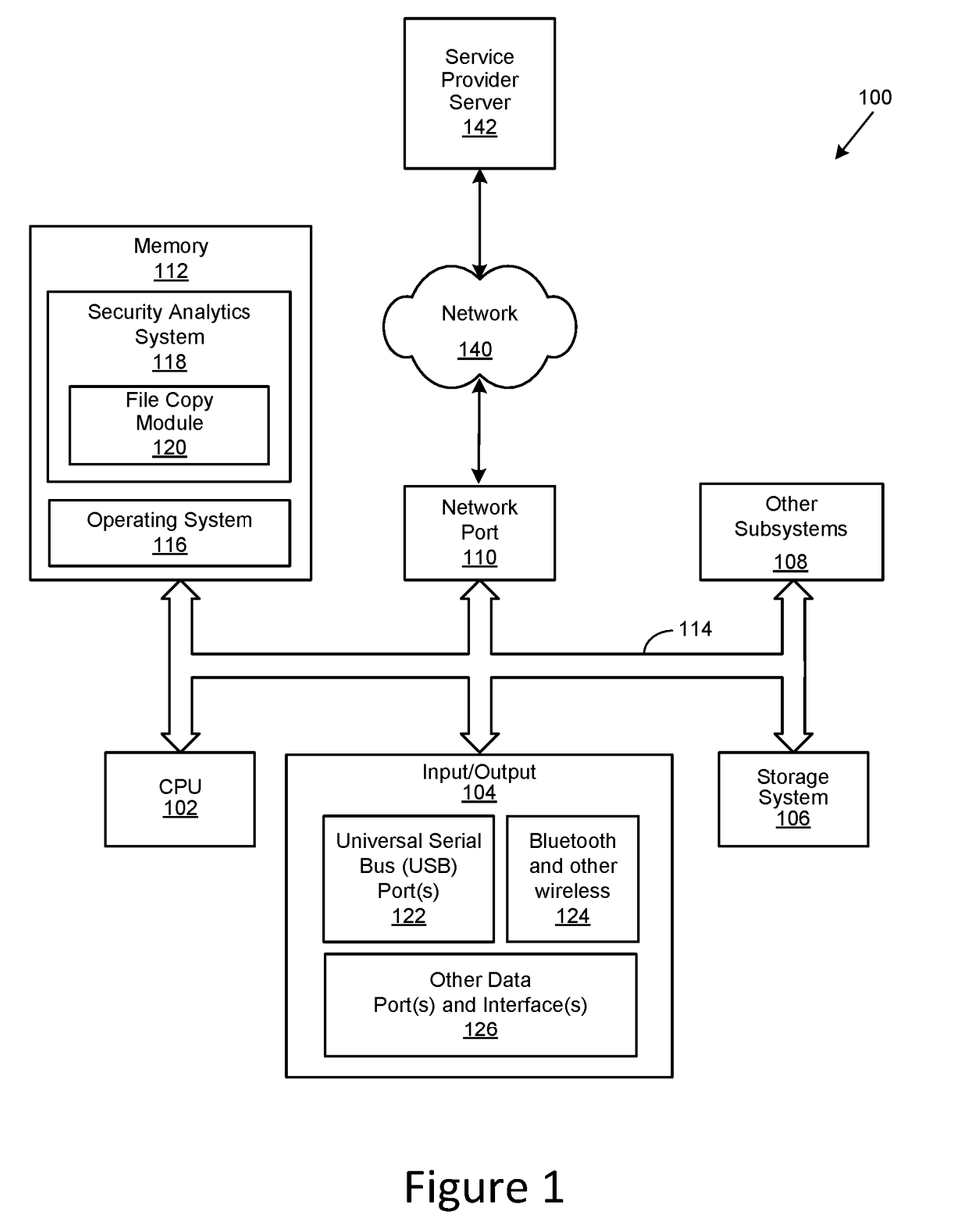
FIG. 1 depicts an information handling system in which the present invention may be implemented.

FIG. 1 is a generalized illustration of a computing device or an information handling system 100 that can be used to implement the system and method of the present invention. The information handling system 100 includes a processor (e.g., central processor unit or "CPU") 102, input/output (I/O) connections or devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes an operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions for detecting if a file(s) is/are copied to/from the information handling system 100 or computing device from/to one or more other devices, such as portable storage devices. In certain embodiments, the security analytics system 118 may include a file copy module 120 to detect if a file(s) is/are copied to/from the information handling system 100 or computing device from/to one or more other devices.

In certain implementations, the input/output (I/O) connections or devices 104 include Universal Serial Bus or USB port(s) 122. The USB port(s) 122 may include any of various USB standards as maintained by the USB Implementers Forum (USB IF), including USB 1.x, USB 2.0 and updates/additions, USB 3.x, etc. In addition, input/output (I/O) connections or devices 104 may include Bluetooth and other wireless connections 124. The input/output (I/O) connections or devices 104 may also include other port(s) and interface(s) 126. In certain implementations, information handling system 100 communicates through input/output (I/O) connections or devices 104 using the MTP protocol to send and receive files.

In general, the file copy module 120 is configured to monitor file activity, such as copying and reading of files, on the computing device or information handling system 100 and connected devices, such as portable storage devices. In certain implementations, a common queue of events related to files is kept, where the common queue is used by the information handling system 100 and the connected devices. For example, by implementing the common queue of events or combined queue of events, file (system) read activities may be correlated with MTP object or file created activities to create a filed copied activity.

In certain implementations, the file copy module 120 is an application that is configured to watch for devices, such as previously unattached/unconnected devices, that are attempting to connect to the information handling system 100. Once the device is detected, a determination may be made if there is a file transfer or MTP activity between the information handling system 100 and device, and such a file transfer or MTP activity may be monitored. In certain implementations, a callback function for the device may be registered, requiring monitoring for MTP activity. Such a callback function may determine what activity occurs. For example, if a windows portable devices (WPD) event activity occurs, such as "WPD_EVENT_OBJECT_ADDED", the information is put in the common or combined queue. However, since WPD events reference objects, the monitoring application or file copy module 120 gathers the information about the object in question such as: size, object file name, the parent object(s) file name(s), timestamp information, device information before adding it to the combined activity queue.

Figure 2:
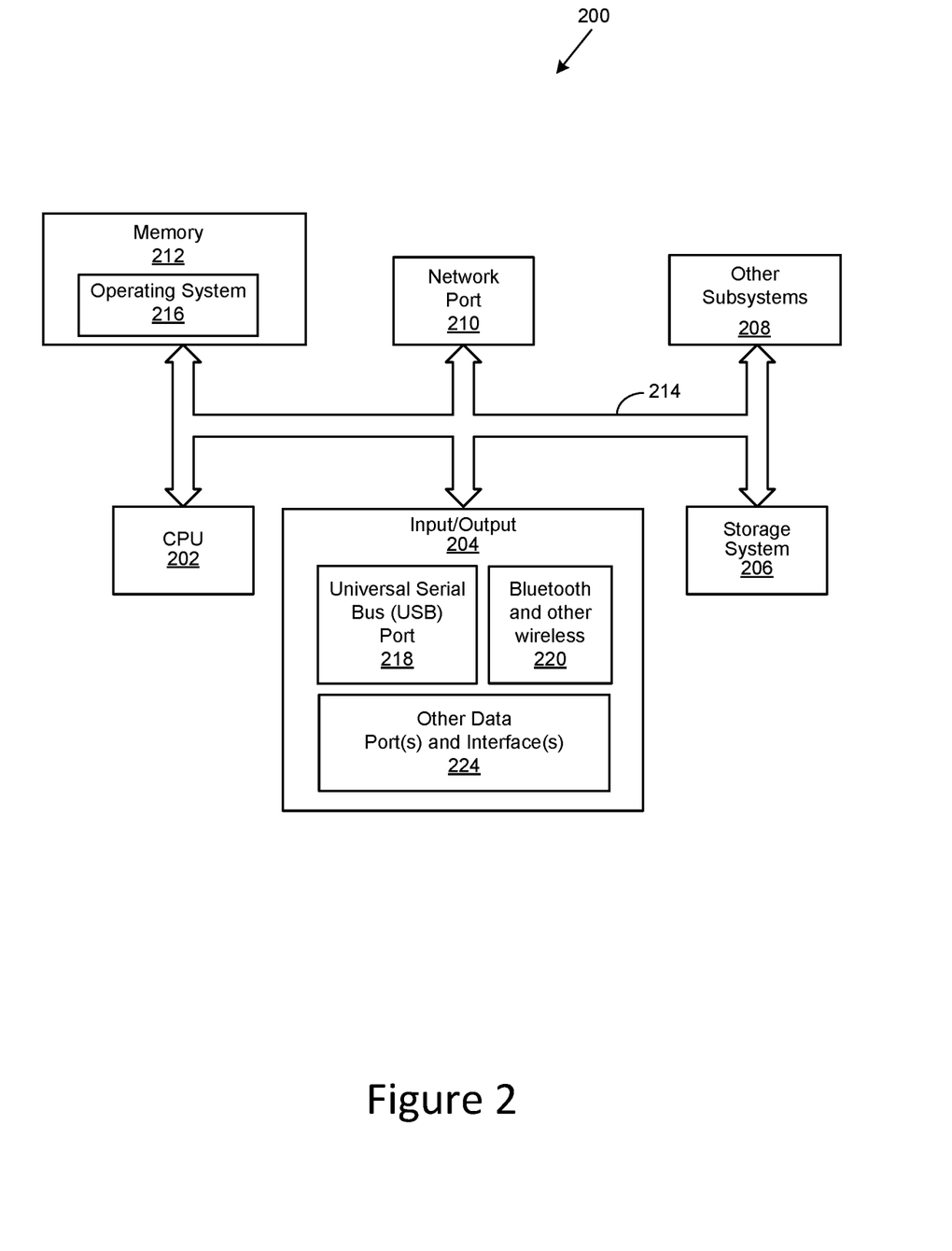
FIG. 2 depicts a portable device in which the present invention may be implemented.

FIG. 2 is a generalized illustration of a portable device 200 that can be used to implement the system and method of the present invention. Portable device 200 may be one of several computing devices, such as a storage device. Examples of portable device 200 may include a personal computer, a laptop computer, a tablet computer, a personal digital assistant (PDA), a smart phone, a mobile telephone, a digital camera, a video camera, or other device that is capable of storing, processing and communicating data.

The portable device 200 includes a processor (e.g., central processor unit or "CPU") 202, input/output (I/O) connections or devices 204, such as a display, a keyboard, a mouse, and associated controllers, a storage system 206, and various other subsystems 208. The portable device 200 likewise includes system memory 212, which is interconnected to the foregoing via one or more buses 214. System memory 112 further includes an operating system (OS) 216.

In certain implementations, the input/output (I/O) connections or devices 204 include Universal Serial Bus or USB port(s) 218. The USB port(s) 218 may include any of various USB standards as maintained by the USB Implementers Forum (USB IF), including USB 1.x, USB 2.0 and updates/additions, USB 3.x, etc. In addition, input/output (I/O) connections or devices 104 may include Bluetooth and other wireless connections 220. The input/output (I/O) connections or devices 204 may also include other port(s) and interface(s) 224. In certain implementations, information handling system 100 communicates through input/output (I/O) connections or devices 204 using the MTP protocol to send and receive files.

Figure 3:
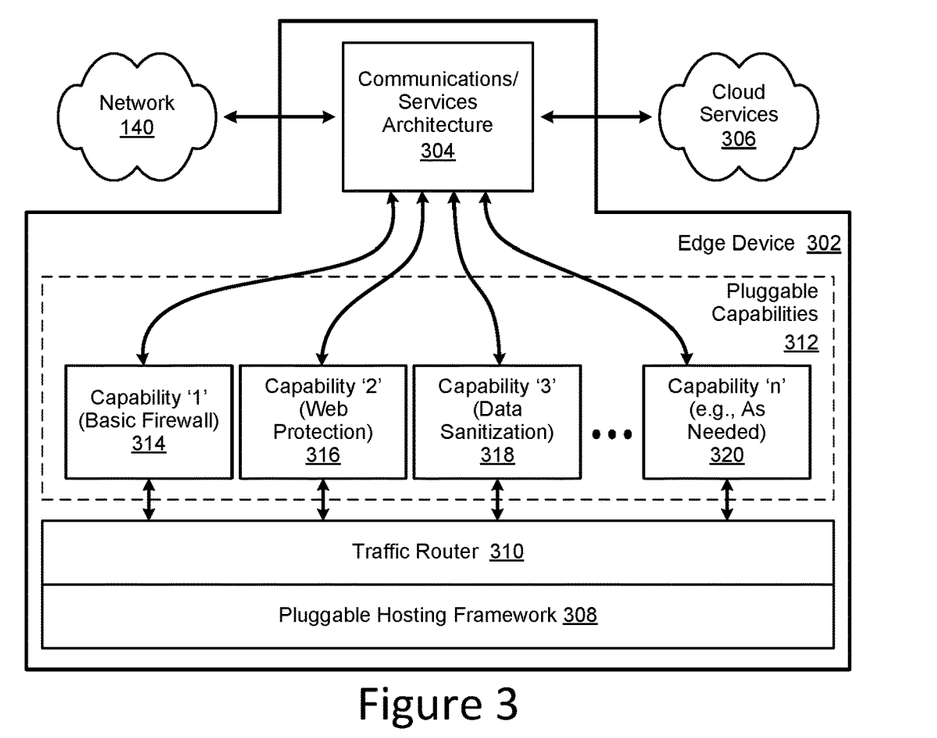
FIG. 3 is a simplified block diagram of an edge device.

FIG. 3 is a simplified block diagram of an edge device implemented in accordance with an embodiment of the invention. As used herein, an edge device, such as the edge device 302 shown in FIG. 3, broadly refers to a device providing an entry point into a network 140. Examples of such edge devices 302 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 302 are often implemented as routers that provide authenticated access to faster, more efficient backbone and core networks. Furthermore, current industry trends include making edge devices 302 more intelligent, which allows core devices to operate at higher speed as they are not burdened with additional administrative overhead. Accordingly, such edge devices 302 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 302 to have redundant links to the core network, which not only provides improved reliability, but enables enhanced, flexible, and scalable security capabilities as well.

In certain embodiments, the edge device 302 may be implemented to include a communications/services architecture 304, various pluggable capabilities 312, a traffic router 310, and a pluggable hosting framework 308. In certain embodiments, the communications/services architecture 302 may be implemented to provide access to and from various networks 140, cloud services 306, or a combination thereof. In certain embodiments, the cloud services 306 may be provided by a cloud infrastructure familiar to those of skill in the art. In certain embodiments, the edge device 302 may be implemented to provide support for a variety of generic services, such as directory integration, logging interfaces, update services, and bidirectional risk/context flows associated with various analytics. In certain embodiments, the edge device 302 may be implemented to provide temporal information, described in greater detail herein, associated with the provision of such services.

In certain embodiments, the edge device 302 may be implemented as a generic device configured to host various network communications, data processing, and security management capabilities. In certain embodiments, the pluggable hosting framework 308 may be implemented to host such capabilities in the form of pluggable capabilities 312. In certain embodiments, the pluggable capabilities 312 may include capability '1' 314 (e.g., basic firewall), capability '2' 316 (e.g., general web protection), capability '3' 318 (e.g., data sanitization), and so forth through capability 'n' 320, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 312 may be sourced from various cloud services 306. In certain embodiments, the pluggable hosting framework 308 may be implemented to provide certain computing and communication infrastructure components, and foundation capabilities, required by one or more of the pluggable capabilities 312. In certain embodiments, the pluggable hosting framework 308 may be implemented to allow the pluggable capabilities 312 to be dynamically invoked. Skilled practitioners of the art will recognize that many such embodiments are possible. Accordingly, the foregoing is not intended to limit the spirit, scope or intent of the invention.

Figure 4:
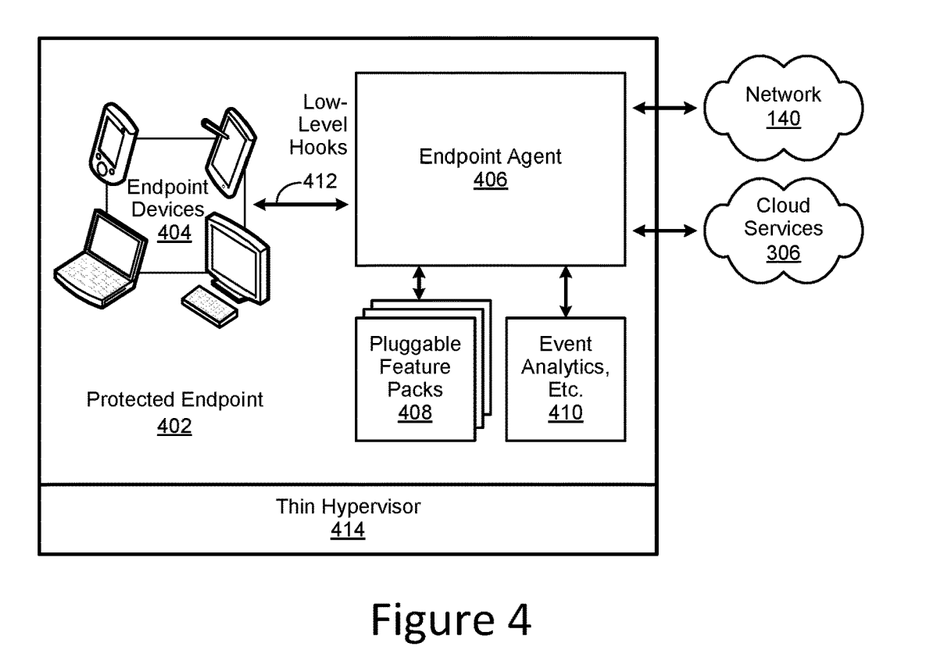
FIG. 4 is a simplified block diagram of an endpoint agent.

FIG. 4 is a simplified block diagram of an endpoint agent implemented in accordance with an embodiment of the invention. As used herein, an endpoint agent 406 broadly refers to a software agent used in combination with an endpoint device 404 to establish a protected endpoint 402. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 404, as likewise used herein, refers to an information processing system (e.g., information handling system 100), such as a personal computer, a laptop computer, a tablet computer, a personal digital assistant (PDA), a smart phone, a mobile telephone, a digital camera, a video camera, or other device that is capable of storing, processing and communicating data. In certain implementations, the endpoint device 404 is embodied as an information handling systems 100. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 404 when it is offline. In this example, the information may be communicated to its intended recipient once the endpoint device 404 gains access to a network 140.

A protected endpoint 402, as likewise used herein, broadly refers to a policy-based approach to network security that typically requires endpoint devices 404 to comply with particular criteria before they are granted access to network resources. As an example, a given endpoint device 404 may be required to have a particular operating system (OS), or version thereof, a Virtual Private Network (VPN) client, anti-virus software with current updates, and so forth. In certain embodiments, the protected endpoint 402 may be implemented to perform operations associated with providing real-time resolution of the identity of an entity at a particular point in time, as described in greater detail herein. In certain embodiments, the protected endpoint 402 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 404 to access and browse a particular website on the Internet. In this example, the individual actions performed by the user to access and browse the website constitute a cyber behavior. As another example, a user may use an endpoint device 404 to send a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 404, or various resources, described in greater detail herein. In certain embodiments, the entities may include various endpoint devices 404 or resources operating at the behest of an entity, such as a user. In certain embodiments, the communication between the entities may include audio, image, video, text, or binary data.

In certain embodiments, the endpoint agent 406 may be implemented to universally support a variety of operating systems, such as Apple Macintosh®, Microsoft Windows®, Linux®, Android® and so forth. In certain embodiments, the endpoint agent 406 may be implemented to interact with the endpoint device 404 through the use of low-level hooks 412 at the OS level. It will be appreciated that the use of low-level hooks 412 allows the endpoint agent 406 to subscribe to multiple events through a single hook. Consequently, multiple functionalities provided by the endpoint agent 406 can share a single data stream, using only those portions of the data stream they may individually need. Accordingly, system efficiency can be improved and operational overhead reduced.

In certain embodiments, the endpoint agent 406 may be implemented to provide a common infrastructure for pluggable feature packs 408. In various embodiments, the pluggable feature packs 408 may provide certain security management functionalities. Examples of such functionalities may include various anti-virus and malware detection, data leak prevention (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 408 is invoked as needed by the endpoint agent 406 to provide a given functionality. In certain embodiments, individual features of a particular pluggable feature pack 408 are invoked as needed. It will be appreciated that the ability to invoke individual features of a pluggable feature pack 408, without necessarily invoking all such features, will likely improve the operational efficiency of the endpoint agent 406 while simultaneously reducing operational overhead. Accordingly, the endpoint agent 406 can self-optimize in certain embodiments by using the common infrastructure and invoking only those pluggable components that are applicable or needed for a given user behavior.

In certain embodiments, the individual features of a pluggable feature pack 308 are invoked by the endpoint agent 406 according to the occurrence of a particular user behavior. In certain embodiments, the individual features of a pluggable feature pack 408 are invoked by the endpoint agent 406 according to the occurrence of a particular temporal event, described in greater detail herein. In certain embodiments, the individual features of a pluggable feature pack 408 are invoked by the endpoint agent 406 at a particular point in time. In these embodiments, the method by which a given user behavior, temporal event, or point in time is selected is a matter of design choice.

In certain embodiments, the individual features of a pluggable feature pack 308 may be invoked by the endpoint agent 406 according to the context of a particular user behavior. As an example, the context may be the user enacting the user behavior, their associated risk classification, which resource they may be requesting, the point in time the user behavior is enacted, and so forth. In certain embodiments, the pluggable feature packs 408 may be sourced from various cloud services 306. In certain embodiments, the pluggable feature packs 408 may be dynamically sourced from various cloud services 306 by the endpoint agent 406 on an as-need basis.

In certain embodiments, the endpoint agent 406 may be implemented with additional functionalities, such as event analytics 410. In certain embodiments, the event analytics 410 functionality may include analysis of various user behaviors, described in greater detail herein. In certain embodiments, the endpoint agent 406 may be implemented with a thin hypervisor 414, which can be run at Ring −1, thereby providing protection for the endpoint agent 406 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 5:
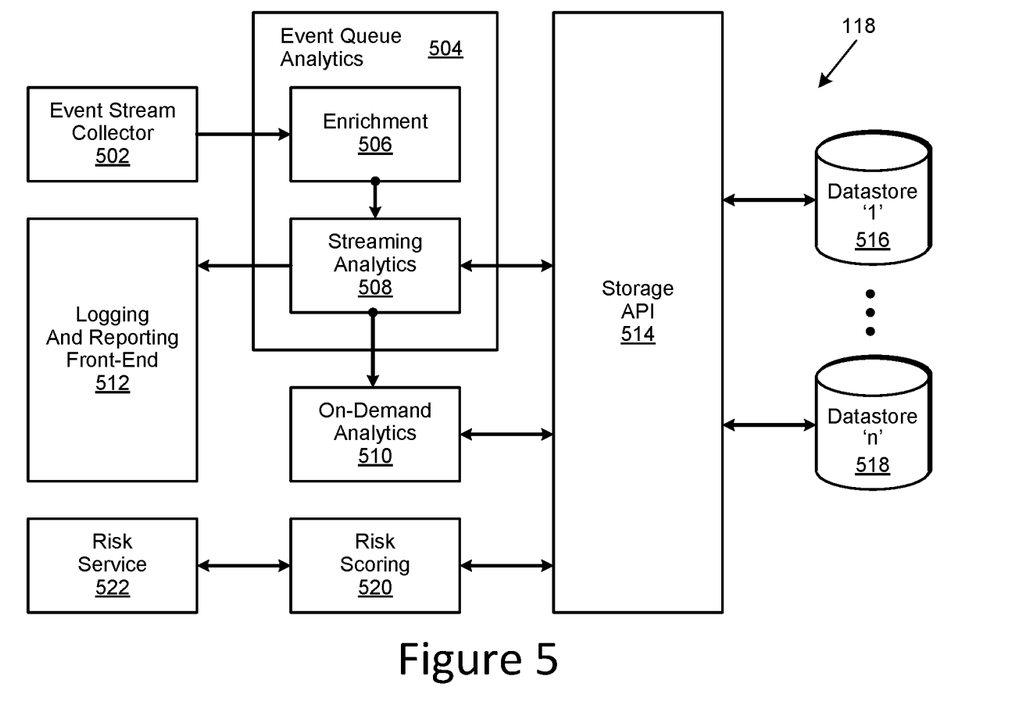
FIG. 5 is a simplified block diagram of a security analytics system.

FIG. 5 is a simplified block diagram of a security analytics system implemented in accordance with an embodiment of the invention. In certain embodiments, the security analytics system 118 shown in FIG. 5 may include an event queue analytics 504 module, described in greater detail herein. In certain embodiments, the event queue analytics 504 subsystem may be implemented to include an enrichment 506 module and a streaming analytics 508 module. In certain embodiments, the security analytics system 118 may be implemented to provide log storage, reporting, and analytics capable of performing streaming 508 and on-demand 510 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 502 may be implemented to collect event and related contextual information, described in greater detail herein, associated with various user behaviors. In these embodiments, the method by which the event and contextual information is selected to be collected by the event stream collector 502 is a matter of design choice. In certain embodiments, the event and contextual information collected by the event stream collector 502 may be processed by an enrichment module 506 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 506 to a streaming 508 analytics module. In turn, the streaming 508 analytics module may provide some or all of the enriched user behavior information to an on-demand 510 analytics module. As used herein, streaming 508 analytics broadly refers to analytics performed in near real-time on enriched user behavior information as it is received. Likewise, on-demand 510 analytics broadly refers herein to analytics performed, as they are requested, on enriched user behavior information after it has been received. In certain embodiments, the enriched user behavior information may be associated with a particular event. In certain embodiments, the enrichment 506 and streaming analytics 508 modules may be implemented to perform event queue analytics 504 operations, as described in greater detail herein.

In certain embodiments, the on-demand 510 analytics may be performed on enriched user behavior associated with a particular interval of, or point in, time. In certain embodiments, the streaming 508 or on-demand 510 analytics may be performed on enriched user behavior associated with a particular user, group of users, one or more entities, or a combination thereof. In certain embodiments, the streaming 508 or on-demand 510 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 508 or on-demand 510 analytics modules may be provided to a storage Application Program Interface (API) 514. In turn, the storage API 512 may be implemented to provide access to various datastores '1' 516 through 'n' 518, which in turn are used to store the results of the analytics operations. In certain embodiments, the security analytics system 118 may be implemented with a logging and reporting front-end 512, which is used to receive the results of analytics operations performed by the streaming 508 analytics module. In certain embodiments, the datastores '1' 516 through 'n' 518 may variously include a datastore of entity identifiers, temporal events, or a combination thereof.

In certain embodiments, the security analytics system 118 may include a risk scoring 520 module implemented to perform risk scoring operations, described in greater detail herein. In certain embodiments, functionalities of the risk scoring 520 module may be provided in the form of a risk management service 522. In certain embodiments, the risk management service 522 may be implemented to perform operations associated with defining and managing a user profile, as described in greater detail herein. In certain embodiments, the risk management service 522 may be implemented to perform operations associated with detecting anomalous, abnormal, unexpected or malicious user behavior and adaptively responding to mitigate risk, as described in greater detail herein. In certain embodiments, the risk management service 522 may be implemented to provide the results of various analytics operations performed by the streaming 506 or on-demand 508 analytics modules. In certain embodiments, the risk management service 522 may be implemented to use the storage API 512 to access various enhanced cyber behavior and analytics information stored on the datastores '1' 514 through 'n' 516. Skilled practitioners of the art will recognize that many such embodiments are possible. Accordingly, the foregoing is not intended to limit the spirit, scope or intent of the invention.

Figure 6:
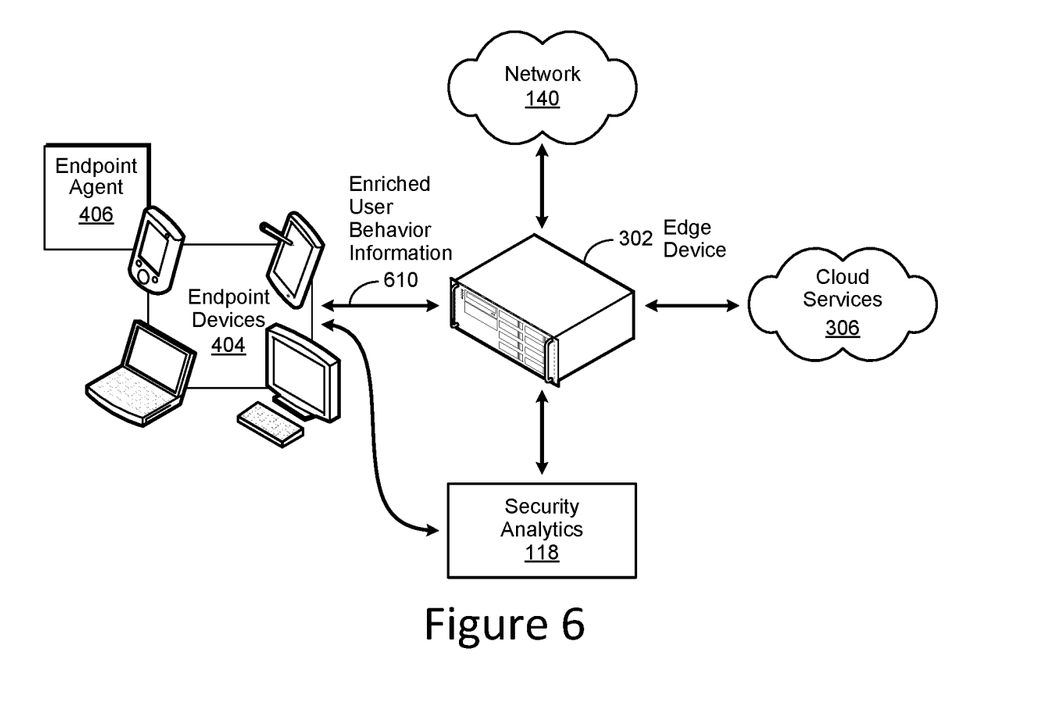
FIG. 6 is a simplified block diagram of a security analytics system.

FIG. 6 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 406, one or more edge devices 302, various cloud services 306, and a network 140 to perform such operations.

In certain embodiments, the network edge device 302 may be implemented in a bridge, a firewall, or a passive monitoring configuration. In certain embodiments, the edge device 302 may be implemented as software running on an information handling system. In certain embodiments, the network edge device 302 may be implemented to provide integrated logging, updating and control. In certain embodiments, the edge device 302 may be implemented to receive network requests and context-sensitive user behavior information in the form of enriched user behavior information 610, described in greater detail herein, from an endpoint agent 406, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 402 and the endpoint agent 406, individually or in combination, may provide certain user behavior information to the security analytics system 118 using either push or pull approaches familiar to skilled practitioners of the art.

As described in greater detail herein, the edge device 402 may be implemented in certain embodiments to receive enriched user behavior information 610 from the endpoint agent 406. It will be appreciated that such enriched user behavior information 610 will likely not be available for provision to the edge device 402 when an endpoint agent 406 is not implemented for a corresponding endpoint device 404. However, the lack of such enriched user behavior information 610 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 406 attaching contextual information to a request. In certain embodiments, the context is embedded within a network request, which is then provided as enriched user behavior information 610. In certain embodiments, the contextual information may be concatenated, or appended, to a request, which in turn may be provided as enriched user behavior information 610. In these embodiments, the enriched user behavior information 610 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 302. In these embodiments, the new flow requests may be provided as enriched user behavior information 610. In certain embodiments, the endpoint agent 406 may also send updated contextual information to the edge device 402 once it becomes available. As an example, an endpoint agent 406 may share a list of files that have been read by a current process at any point in time once the information has been collected. To continue the example, such a list of files may be used to determine which data the endpoint agent 406 may be attempting to exfiltrate.

In certain embodiments, point analytics processes executing on the edge device 402 may request a particular service. As an example, risk scores associated with a particular event on a per-user basis may be requested. In certain embodiments, the service may be requested from the security analytics system 118. In certain embodiments, the service may be requested from various cloud services 406.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 404. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 302 can then use this information to manage the appropriate response to submitted requests.

In certain embodiments, the security analytics system 118 may be implemented in different operational configurations. In certain embodiments, the security analytics system 118 may be implemented by using the endpoint agent 406. In certain embodiments, the security analytics system 118 may be implemented by using endpoint agent 406 in combination with the edge device 302. In certain embodiments, the cloud services 306 may likewise be implemented for use by the endpoint agent 406, the edge device 302, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 406 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 404. It will be appreciated that such an approach may prove advantageous when an adversary is "moving sideways" through a network environment, using different endpoint devices 404 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 402 and security analytics system 118 may be coupled such that requests can be contextualized and fitted into a framework that evaluates their associated risk. Certain embodiments of the invention reflect an appreciation that such an approach works well with web-based data leak protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 302 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 406, which allows the quantity and type of information associated with particular hosts to be measured. In turn, this information may be used to determine how the edge device 302 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 7:
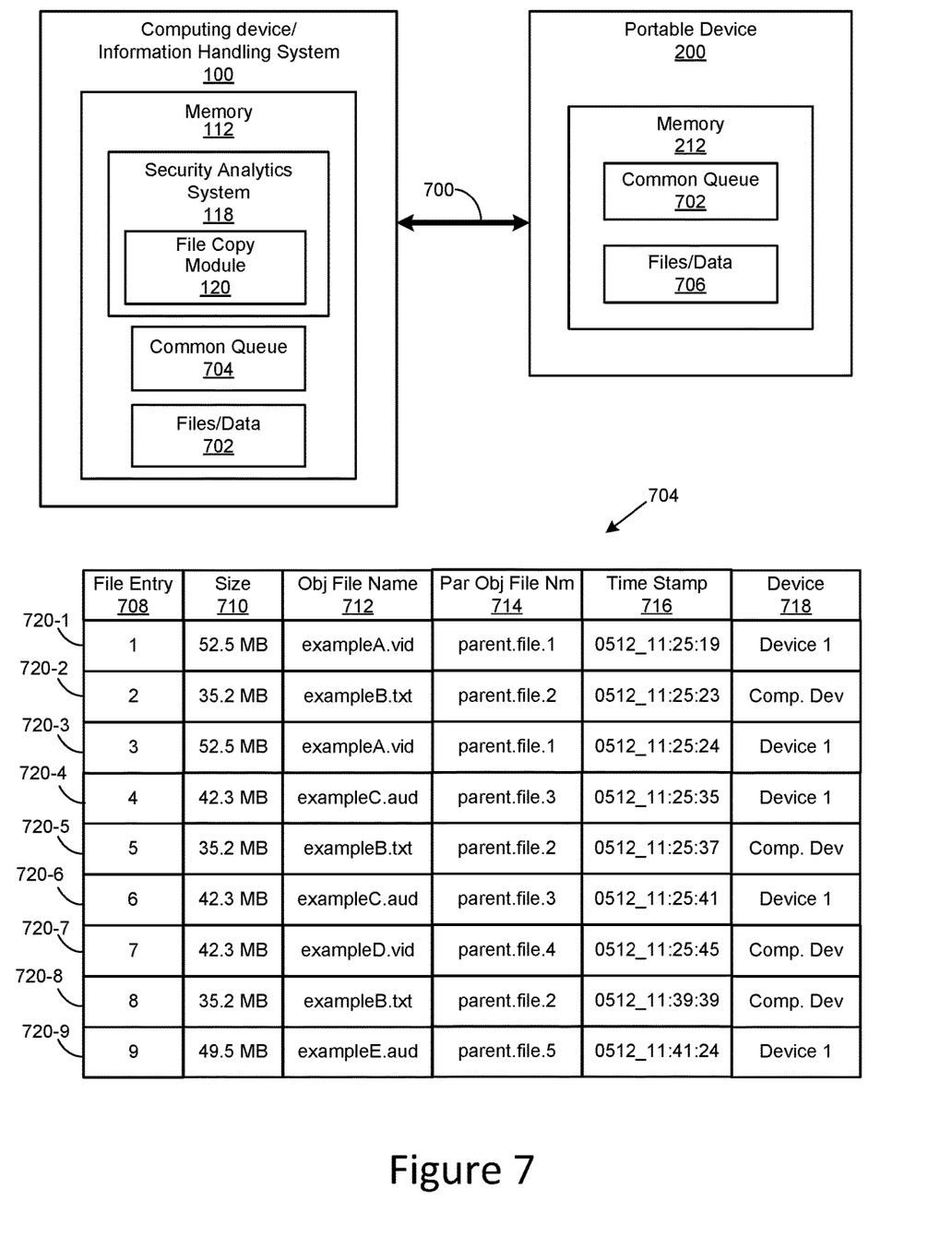
FIG. 7 is depicts a common or combined queue of events for a computing device and a connected device.

FIG. 7 is depicts a common or combined queue of events for a computing device and a connected device. A computing device or information handling system 100 communicates or is connected to one or more devices, such as portable device 200. The connection is represented by connection arrow 700. In certain implementations, Media Transfer Protocol or MTP is used. Connection 700 provides for the transfer of data or files between information handling system 100 and portable device 200. The transfer can occur over various connections, such as universal serial bus (USB), Bluetooth, Transmission Control Protocol (TCP), etc.

In certain implementations, the information handling system 100 includes memory 112 that stores files/data 702. The files/data 702 includes various types of media data or files, such text, graphics, audio, video, etc. Such files or data can be transferred or received from portable device 200. In certain implementations, memory 112 further includes a combined or common queue of events 704 that is shared with portable device 200. In certain embodiments, the security analytics system 118, and in particular the file copy module 120, in memory 112 generates and manages the common queue 704 and the files/data 702.

The portable device 200 includes a separate and independent files/data 706. In certain implementations, the files/data 706 is in memory 212 of portable device 200. The files/data 706 includes various types of media data or files, such text, graphics, audio, video, etc. Such files or data can be transferred or received from information handling system, 100. In certain implementations, memory 212 further includes the combined or common queue of events 704 that is shared with information handling system 100.

In certain embodiments the common queue 704 is configured as a table or listing. In certain implementations, windows portable devices (WPD) event activities are monitored by an application or the file copy module 120. The file copy module 120 may be configured to gather the information about objects or files related to size, object file name, parent object file name, timestamp information, device information, etc. Such information may be gathered before the information is added to the common queue 704. In this example, common queue 704 includes headings for file entry 708, size 710, object file name 712, parent object file name 714, time stamp 716, and device 718. Time stamp information is in the form of MMdd_HH:mm:ss, where "MM" is month, "HH" is hour, "mm"' is minute, and "ss" is second. Table 704 includes entries 720 that are particular to specific files or data that are identified as a monitored file activity. A monitored file activity may be a file copy or file read between the information handling system 100 and the portable device 200.

In certain implementations, an application or the file copy module 120 creates, and monitors the common queue 704. Furthermore, the application or the file copy module 120 performs comparisons on entries 720 to determine if a file copy or read has been performed, which device (e.g., information handling system 100 or portable device) the file was copied to/read from and copied from/read to. Entries may be compared based on size 710 and/or time stamp 716 information. Based on such comparisons a determination may be made as to a file copy and read. For example, a comparison of entries 720 is made as to size 710. Entries with the same size 510 may the same file. Furthermore, a comparison may be made as to time stamp 716 information.

Using a predetermined time window, a determination may be made as to whether a file copy or file read was made. In other words, if two entries 720 have the same size and if the two entries occur within the predetermined time window, then an assumption may be made that the entry 720 with an earlier time was a file activity that was a file read, and the entry 720 with the later time was a file copy. For example, setting a time window of 20 seconds, where 20 seconds would be a maximum time that a file read and file copy would take place. Now, comparing entry 720-1 and 720-3, their file sizes are the same, which is 52.5 MB. Entry 720-1 has a time stamp of 0512_11:25:19, and entry 720-3 has time stamp of 0512_11:25:25. The time window of 20 second is satisfied, since there is only a six second difference in the time stamp values of entries 720-1 and 720-3. Therefore, an assumption can be made that entry 720-1 was a file copy (from device 1 or portable device 200) and that entry 720-3 was a file read (to computing device or information handling system 100). Likewise, in this example, file copy/file read pairs are found for entries 720-2 and 720-5, and entries 720-4 and 720-6. Entries 720-7 and 720-9 do not have a corresponding pair. Although, entry 720-8 corresponds in size to entries 720-2 and 720-5, the time window of 20 between entry 720-8 and the latest time stamp of entry 720-5 is exceeded. Time stamp for entry 720-5 being 0512_11:25:37, and time stamp for entry 720-8 being 0512_11:39:39. The time difference being 14 minutes and 2 seconds, far exceeding the predetermined time window of 20 seconds.

The determined file copy and file read entries may be recorded and provided to information handling system 100 and portable device 200. In certain implementations, the common queue 704 may dynamically change, adding and eliminating entries 720 over time.

Figure 8:
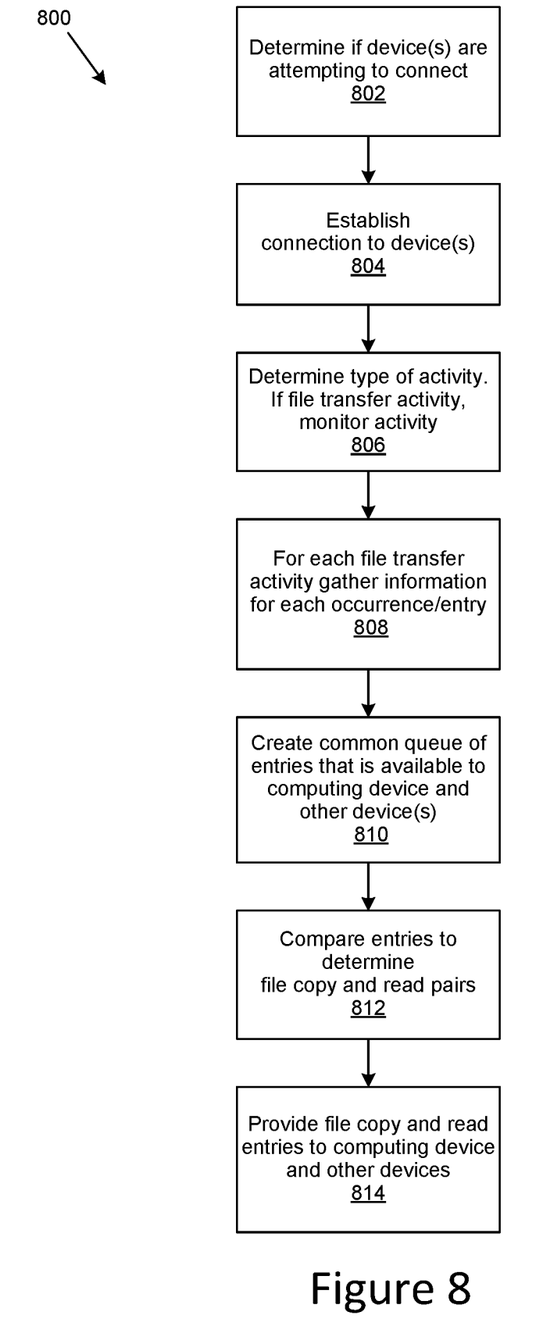
FIG. 8 is a generalized flowchart for detecting if a file(s) is/are copied to/from a computing device from/to one or more other devices.

FIG. 8 is a generalized flowchart for detecting if a file(s) is/are copied to/from a computing device from/to one or more other devices. At step 802, a determination is made whether a device or devices, such as a portable device, are attempting to connect to a computing device or information handling device. At step 804, a connection is established connecting the computing device or information handling device to the device or devices. The connection be over various interfaces and use Media Transfer Protocol or MTP. At step 806, a determination is made as to the type of activity is performed over the connection. If the activity is related to a file transfer, then the file transfer activity is monitored. In certain implementations, monitoring of the file transfer activity includes registering for a callback function, requiring monitoring for MTP activity. At step 808, information is gathered for each file transfer occurrence or entry. Information for each entry may include size, object file name, the parent object file name, timestamp information, and device information. At step 810, a combined or common queue of entries is created. The common queue is made available to the computing device and the connected device(s). At block step 812, entries in the common queue are compared to determine pairs of file copy and file read entries. At block 814, a list of entries that are file copy and file ready are provided to the computing device and connected device(s).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for monitoring and detecting file copy activity between an information handling device and one or more devices attempting to connect with the information handling device over a Media Transfer Protocol (MTP) connection, the method comprising:

the information handling device including a protected endpoint device interacting with an endpoint agent through at least one low-level hook, wherein the endpoint agent implements a security analytics system, and wherein the security analytics system includes a file copy module, an event stream collector, an event queue analytics module, and a storage Application Program Interface (API);

establishing a connection with the protected endpoint device and the one or more devices attempting to connect with the protected endpoint device;

monitoring, by the file copy module, MTP file activities between the protected endpoint device and the one or more devices attempting to connect with the protected endpoint device by:

registering a callback function for each of the one or more devices attempting to connect with the protected endpoint device, wherein the callback function requires monitoring for MTP file copy activities and MTP file read activities;

creating, by the file copy module, a common queue of events for the protected endpoint device and the one or more devices attempting to connect with the protected endpoint device;

gathering, by the file copy module, information related to each occurrence of file activities into the common queue of events;

entering, by the file copy module, the information related to each occurrence of file activities as an entry into the common queue of events, wherein each entry includes a file size, a time stamp, and device information comprising a device name of a device attempting to connect with the protected endpoint device;

detecting, by the file copy module, one or more file copy activities by comparing entries in the common queue of events to determine entry pairs having same file sizes and time stamps within a predetermined time window, wherein each determined entry pair comprises a file read and a file create corresponding to a file copy activity;

subscribing, by the endpoint agent implementing the security analytics system, to events through the at least one low-level hook;

collecting, by the event stream collector of the security analytics system, event and related contextual information associated with one or more user behaviors;

processing, by the event queue analytics module of the security analytics system, the event and the related contextual information to generate enriched user behavior;

generating, by the event queue analytics module of the security analytics system, one or more analytic results by analyzing the enriched user behavior associated with the related contextual information, wherein the related contextual information may include at least one of an entity, a particular resource, or a service;

storing, by the storage API of the security analytics system, the one or more analytic results in one or more datastores.

2. The method of claim 1, wherein the common queue of events is dynamically updated with entries.

3. The method of claim 1 further comprising providing a list of file activities based on the entry pairs determined to be file copy activities.

4. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for monitoring and detecting file copy activity between an information handling device and one or more devices attempting to connect with the information handling device over a Media Transfer Protocol (MTP) connection, and comprising instructions executable by the processor and configured for:
the information handling device including a protected endpoint device interacting with an endpoint agent through at least one low-level hook, the endpoint agent implementing a security analytics system, and the security analytics system including a file copy module, an event stream collector, an event queue analytics module, and a storage Application Program Interface (API);
establishing a connection with the protected endpoint device and the one or more devices attempting to connect with the protected endpoint device;
monitoring, by the file copy module, MTP file activities between the protected endpoint device and the one or more devices attempting to connect with the protected endpoint device by:
registering a callback function for each of the one or more devices attempting to connect with the protected endpoint device, wherein the callback function requires monitoring for MTP file copy activities and MTP file read activities;
creating, by the file copy module, a common queue of events for the protected endpoint device and the one or more devices attempting to connect with the protected endpoint device;
gathering, by the file copy module, information related to each occurrence of file activities into the common queue of events;
entering, by the file copy module, the information related to each occurrence of file activities as an entry into the common queue of events, wherein each entry includes a file size, a time stamp, and device information comprising a device name of a device attempting to connect with the protected endpoint device;
detecting, by the file copy module, one or more file copy activities by comparing entries in the common queue of events to determine entry pairs having same file sizes and time stamps within a predetermined time window, wherein each determined entry pair comprises a file read and a file create corresponding to a file copy activity;
subscribing, by the endpoint agent implementing the security analytics system, to events through the at least one low-level hook;

collecting, by the event stream collector of the security analytics system, event and related contextual information associated with one or more user behaviors;
processing, by the event queue analytics module of the security analytics system, the event and the related contextual information to generate enriched user behavior;
generating, by the event queue analytics module of the security analytics system, one or more analytic results by analyzing the enriched user behavior associated with the related contextual information, wherein the related contextual information may include at least one of an entity, a particular resource, or a service;
storing, by the storage API of the security analytics system, the one or more analytic results in one or more datastores.

5. The system of claim 4, wherein the common queue of events is dynamically updated with entries.

6. The system of claim 4 further comprising providing a list of file copy activities based on the pairs determined to be file copy activities.

7. A non-transitory, computer-readable storage medium embodying computer program code for monitoring and detecting file copy activity between an information handling device and one or more devices attempting to connect with the information handling device over a Media Transfer Protocol (MTP) connection, the computer program code comprising computer executable instructions configured for:
the information handling device including a protected endpoint device interacting with an endpoint agent through at least one low-level hook, the endpoint agent implementing a security analytics system, and the security analytics system including a file copy module, an event stream collector, an event queue analytics module, and a storage Application Program Interface (API);
establishing a connection with the protected endpoint device and the one or more devices attempting to connect with the protected endpoint device;
monitoring, by the file copy module, MTP file activities between the protected endpoint device and the one or more devices attempting to connect with the protected endpoint device by:
registering a callback function for each of the one or more devices attempting to connect with the protected endpoint device, wherein the callback function requires monitoring for MTP file copy activities and MTP file read activities;
creating, by the file copy module, a common queue of events for the protected endpoint device and the one or more devices attempting to connect with the protected endpoint device;
gathering, by the file copy module, information related to each occurrence of file activities into the common queue of events;
entering, by the file copy module, the information related to each occurrence of file activities as an entry into the common queue of events, wherein each entry includes a file size, a time stamp, and device information comprising a device name of a device attempting to connect with the protected endpoint device;
detecting, by the file copy module, one or more file copy activities by comparing entries in the common queue of events to determine entry pairs having same file sizes and time stamps within a predetermined time window, wherein each determined entry pair comprises a file read and a file create corresponding to a file copy activity;

subscribing, by the endpoint agent implementing the security analytics system, to events through the at least one low-level hook;

collecting, by the event stream collector of the security analytics system, event and related contextual information associated with one or more user behaviors;

processing, by the event queue analytics module of the security analytics system, the event and the related contextual information to generate enriched user behavior;

generating, by the event queue analytics module of the security analytics system, one or more analytic results by analyzing the enriched user behavior associated with the related contextual information, wherein the related contextual information may include at least one of an entity, a particular resource, or a service;

storing, by the storage API of the security analytics system, the one or more analytic results in one or more datastores.

8. The non-transitory, computer-readable storage medium of claim 7, wherein the common queue of events is dynamically updated with entries.

9. The non-transitory, computer-readable storage medium of claim 7, further comprising providing a list of file copy activities based on the pairs determined to be file copy activities.

10. The non-transitory, computer-readable storage medium of claim 7, wherein the computer executable instructions are deployable to a client system from a server system at a remote location.

11. The non-transitory, computer-readable storage medium of claim 7, wherein the computer executable instructions are provided by a service provider to a user on an on-demand basis.

* * * * *